(12) United States Patent
Franke et al.

(10) Patent No.: US 8,593,136 B2
(45) Date of Patent: Nov. 26, 2013

(54) MEASURING APPARATUS FOR THE DETECTION OF A RELATIVE MOVEMENT

(75) Inventors: Joerg Franke, Freiburg (DE); Klaus Heberle, Emmendingen (DE)

(73) Assignee: Micronas GmbH, Freiburg i.Br. (DE)

( * ) Notice: Subject to any disclaimer, the term of this patent is extended or adjusted under 35 U.S.C. 154(b) by 245 days.

(21) Appl. No.: 13/131,783

(22) PCT Filed: Nov. 27, 2009

(86) PCT No.: PCT/EP2009/008453
§ 371 (c)(1),
(2), (4) Date: Aug. 16, 2011

(87) PCT Pub. No.: WO2010/060629
PCT Pub. Date: Jun. 3, 2010

(65) Prior Publication Data
US 2011/0291645 A1    Dec. 1, 2011

(30) Foreign Application Priority Data
Nov. 27, 2008    (DE) .......................... 10 2008 059 402

(51) Int. Cl.
*G01B 7/14*    (2006.01)
(52) U.S. Cl.
USPC .............. 324/207.2; 324/207.24; 324/207.25
(58) Field of Classification Search
USPC .................................. 324/207.12–207.25, 174
See application file for complete search history.

(56) References Cited

U.S. PATENT DOCUMENTS

| 5,880,586 | A | 3/1999 | Dukart et al. |
| 6,486,657 | B2 * | 11/2002 | Schroeder ................ 324/207.21 |
| 6,545,462 | B2 * | 4/2003 | Schott et al. ................ 324/207.2 |
| 7,535,215 | B2 * | 5/2009 | Forster .......................... 324/165 |
| 2002/0021124 | A1 | 2/2002 | Schott et al. |
| 2005/0258820 | A1 | 11/2005 | Forster |
| 2007/0229060 | A1 | 10/2007 | Taguchi et al. |

FOREIGN PATENT DOCUMENTS

| DE | 195 43 564 A1 | 5/1996 |
| DE | 10 2004 017 191 A1 | 10/2005 |
| EP | 0 726 448 A1 | 8/1996 |
| EP | 1 182 461 A2 | 2/2002 |

* cited by examiner

Primary Examiner — Jay Patidar
(74) Attorney, Agent, or Firm — Muncy, Geissler, Olds & Lowe, PLLC

(57) ABSTRACT

A measuring apparatus for detecting a relative movement between at least one magnetic field sensor array integrated into a semiconductor chip and a transmitter for the sensor array is provided. The transmitter and the sensor array are exposed to the magnetic flux of a magnet. The transmitter has teeth that can be moved past the sensor array during the relative movement, or the transmitter has magnet poles that can be moved past the sensor array during the relative movement. The magnetic field sensor includes a differential magnetic field sensor which comprises a first measuring plate and a second measuring plate that are offset in relation to one another in a direction of the relative movement. The magnetic field sensor also includes a sensor element which is designed to measure the absolute magnetic field and comprises a third measuring plate that is arranged between the first measuring plate and the second measuring plate in the direction of the relative movement.

6 Claims, 4 Drawing Sheets

MEASURING APPARATUS FOR THE DETECTION OF A RELATIVE MOVEMENT

This nonprovisional Application is a national phase under 35 U.S.C. §371 of PCT International Application No. PCT/EP2009/008453, which was filed on Nov. 27, 2009, and which claims priority to German Patent Application No. DE 10 2008 059 402.4, which was filed in Germany on Nov. 27, 2008, and which are both herein incorporated by reference.

BACKGROUND OF THE INVENTION

1. Field of the Invention

The invention relates to a measuring device for detecting a relative movement between at least one magnetic field sensor array, integrated into a semiconductor chip, and a transmitter for said sensor array, whereby the transmitter and the sensor array are penetrated by the magnetic flux of a magnet and the transmitter has teeth, which can be moved past the sensor array during the relative movement, or whereby the transmitter has magnetic poles, which can be moved past the sensor array during the relative movement, whereby the sensor array has a differential magnetic field sensor, which has a first measuring plate and a second measuring plate, which are offset relative to one another in the direction of the relative movement.

2. Description of the Background Art

EP 1 182 461 A2, which corresponds to U.S. Pat. No. 6,545,462, discloses a measuring device of this type, which has a disk-shaped transmitter with magnetic poles, which move past the magnetic field sensor during a rotation movement of the transmitter around an axis arranged at right angles to the plane of the disk. The magnetic field sensor has three differential magnetic field sensors which are integrated into a semiconductor chip and each of which has two horizontal measuring plates, which are arranged at a distance of 120° on a circular path concentric to the transmitter's axis of rotation. A disk-shaped layer of a magnetically conductive material, which acts as a magnetic field concentrator and covers the measuring plates, is arranged on the semiconductor chip. In a measuring device in which the distance between the two measuring plates of the differential magnetic field sensor in the direction of the relative movement is small relative to the distance of the magnetic pole, only a correspondingly small differential measuring signal results. At large relative velocities between the transmitter and semiconductor chip, the differential measuring signal can be evaluated relatively well in order to determine, e.g., the relative position between the transmitter and semiconductor chip. At small relative velocities and particularly when the differential magnetic field sensor is arranged centered between two magnetic poles of the transmitter, the evaluation of the differential measuring signal is difficult, however.

EP 1 182 461 A2 discloses further a measuring device, which has two differential magnetic field sensors which are integrated into a semiconductor chip and each of which comprises two horizontal measuring plates, which are arranged at a distance of 180° on a circular path concentric to the transmitter's axis of rotation. In addition, a magnetic field sensor element with another horizontal measuring plate, which is arranged centrally to the circular path, is provided in the semiconductor chip. The absolute value of the magnetic field in the center of the circle can in fact be measured with the aid of this sensor element. The sensor element, however, is not suitable for detecting the relative position of the teeth or magnetic poles of a transmitter arranged concentrically to the circular path. Thus, only differential measuring signals are available here as well for determining the rotational position of the teeth or magnetic poles of the transmitter.

DE 10 2004 017 191 A1, which corresponds to U.S. Pat. No. 7,535,215, discloses a measuring device, which has a first differential magnetic field sensor which is integrated into a semiconductor chip and has two magnetic field sensors of the same type, each of which detects a horizontal magnetic field component. The distance of the first magnetic field sensors corresponds to the pitch length of the pole wheel. In addition, the semiconductor chip has a second differential magnetic field sensor, which has two magnetic field detection devices, whose spacing also corresponds to the pitch length and each of which is arranged above or below a magnetic field sensor assigned to it. The differential measuring signal of the first differential magnetic field sensor is used as a rotary speed signal. A direction signal is generated from the differential measuring signals of the two differential magnetic field sensors. The measuring device, however, has a relatively complicated structure.

SUMMARY OF THE INVENTION

It is therefore an object of an embodiment of the invention to provide a measuring device of the aforementioned type, which enables a high measuring accuracy with a simple structure.

This object is achieved in that the magnetic field sensor has a sensor element, designed for measuring the absolute magnetic field, with a third measuring plate, which is arranged between the first measuring plate and the second measuring plate in the direction of the relative movement.

The measuring device, therefore, makes available in an advantageous manner an absolute measuring signal, in addition to a differential measuring signal, whereby both measuring signals relate to the same location in the magnetic field. The third measuring plate in the case of a magnetic field running symmetrically to the teeth or magnetic poles of the transmitter is arranged preferably centered between the first and second measuring plate, particularly on a line connecting the first and second measuring plate and running along the path of the relative movement. The measuring plates are preferably made as Hall plates, which are connected to a suitable control and evaluation device.

In an embodiment of the invention, the measuring plates are arranged in such a way that they are sensitive to a magnetic flux component running in the direction of the relative movement. In this case, the measuring plates are preferably arranged vertically, i.e., transverse and especially at right angles to the plane of the semiconductor chip. It is also possible, however, to provide horizontal measuring plates and to divert the magnetic flux component running in the direction of the relative movement with the aid of a flux conducting body, consisting of a magnetically highly conductive material, in a direction running normal to the plane of the semiconductor chip.

In another embodiment of the invention, the measuring plates are arranged in such a way that they are sensitive to a magnetic flux component running transverse and especially normal to the direction of the relative movement. The measuring plates in this case preferably extend into the plane of the semiconductor chip.

In a refinement of the invention, the magnetic field sensor has at least two of the sensor arrays, each consisting at least of the differential magnetic field sensor and the sensor element, whereby the measuring directions of said sensor arrays are oriented transverse and especially at right angles to one another. Said embodiment is regarded as especially advantageous, because it enables a simultaneous absolute and differential detection of two magnetic field components running transverse to one another at the same place, particularly the horizontal and vertical component.

Further, there is the possibility of comparing with one another the measuring signals of measuring plates, in which the centers of the areas spanned by the measuring plates are arranged in the same plane running at right angles to the direction of the relative movement, and of generating pulses as a function of the result of this comparison. In this regard, the pulses can be generated particularly when the measuring signals and/or the values of the measuring signals agree. A signal converter stage can be connected for this purpose to the measuring signal outputs of at least two measuring plates, which are arranged in planes running transverse and preferably at right angles to one another.

A measuring signal output of at least one measuring plate can be connected to a signal converter stage, which has an output to which the pulses synchronously assigned to the relative movement can be output. The pulses can be output at extreme values of the measuring signals and/or depending on the result from the comparison of a measuring signal with a reference value.

To reduce an offset or a bias voltage in a measured Hall voltage, it is advantageous when at least one measuring plate has two contact pairs, each with spaced-apart terminal contacts, for applying Hall sensor currents and/or for tapping Hall voltages, when the measuring device has a current source for generating Hall sensor currents and output terminals to output the Hall voltage, when the terminal contacts can be connected via a switching device to the current source and to the output terminals, and when the switching device has a control connection with a control device in such a way that the following steps can be run through one after another:
a) Connection of the current source to the first contact pair and connection of the output terminals to a second contact pair,
b) Connection of the current source to the second contact pair and connection of the output terminals to the first contact pair.

It is possible thereby to supply current to the measuring plate successively in different directions and for each current supply direction to measure a Hall voltage. The average can be obtained from the thus obtained Hall voltages to compensate for a possible offset in the Hall voltages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
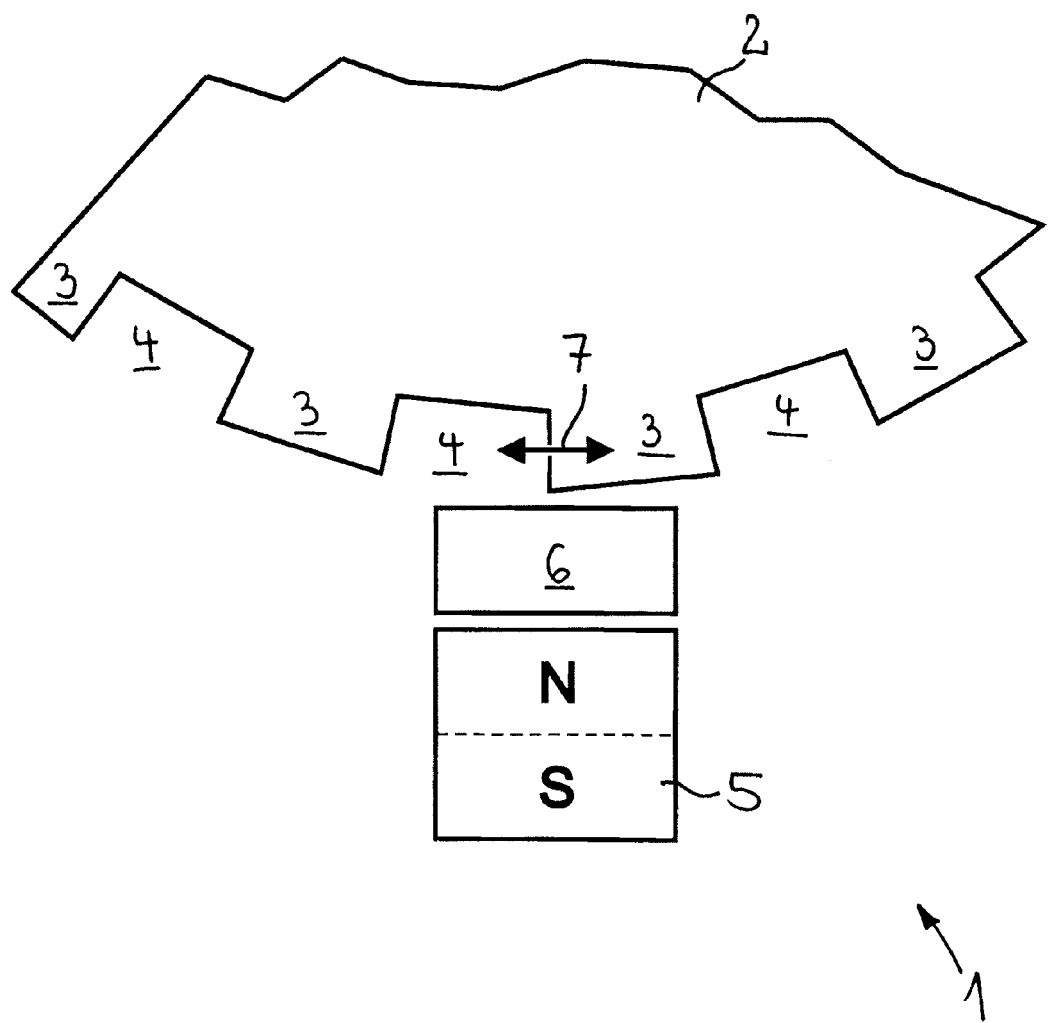
FIG. 1A shows a partial view of a measuring device to detect a relative movement between a transmitter wheel having teeth and at least one magnetic field sensor integrated into a semiconductor chip.

A measuring device, which as a whole is designated with 1 in FIG. 1A, for detecting a relative movement has a soft magnetic transmitter 2, which is designed as a gear and is disposed rotatable around an axis of rotation at a support not shown in greater detail in the drawing. Transmitter 2 has at its outer circumference a plurality of teeth 3, which are spaced apart in the circumferential direction and between which tooth spaces 4 are formed.

Further, a permanent magnet 5 is arranged at the outer circumference of transmitter 2 and is separated from transmitter 2 by an air gap in the radial direction. Magnet 5 is magnetized approximately radially to the axis of rotation of transmitter 2.

In the air gap, a semiconductor chip 6 is arranged which is oriented with its chip plane parallel to the axis of rotation of transmitter 2 and parallel to the direction of motion 7 of teeth 3 and tooth spaces 4 that can be moved past semiconductor chip 6. A magnetic field sensor is integrated into the semiconductor chip. The magnetic flux generated by magnet 5 flows through transmitter 2 and the magnetic field sensor.

Figure 1B:
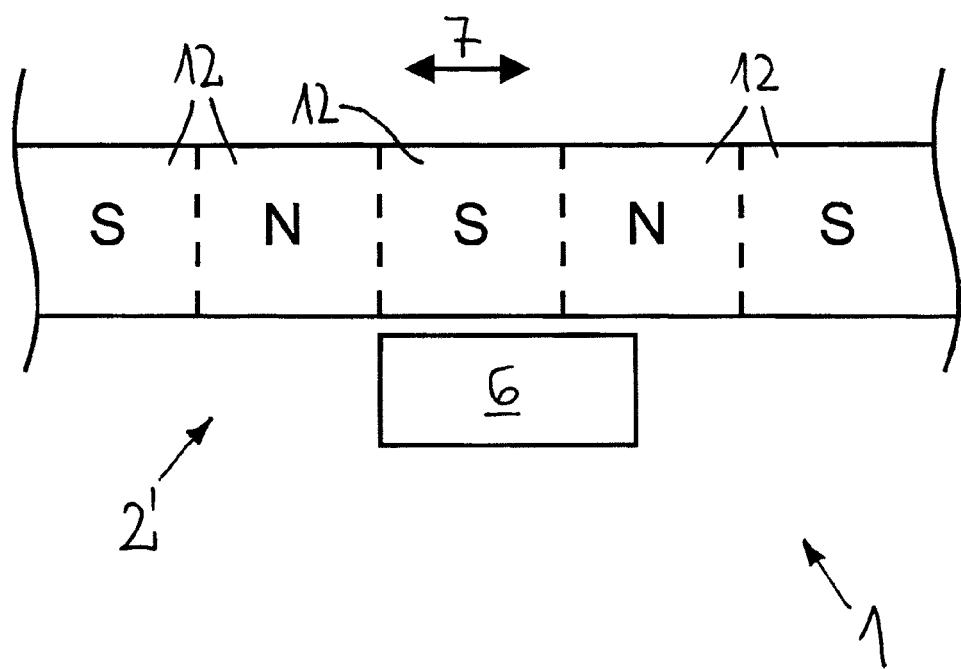
FIG. 1B shows a partial view of a measuring device to detect a relative movement between a transmitter having a magnetic pole and at least one magnetic field sensor integrated into a semiconductor chip.

In the exemplary embodiment shown in FIG. 1B, measuring unit 1 has a rod-shaped transmitter 2', which is movable in the direction of motion 7 of the relative movement. Transmitter 2' has a series of magnetic poles 12, extending in the direction of motion 7, magnetized alternately in directions opposite to one another. A semiconductor chip 6 having a magnetic field sensor, which faces magnetic poles 12 with a flat side and runs with its chip plane parallel to direction of motion 7, is arranged in the magnetic flux generated by transmitter 2'.

Figure 2A:
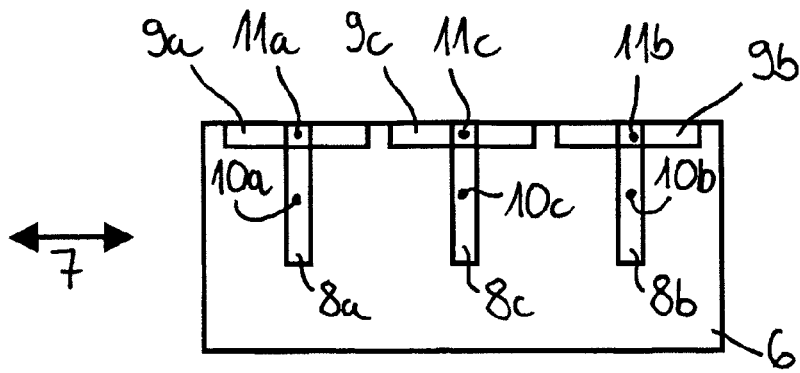
FIGS. 2A to 2H show cross sections through different exemplary embodiments of the semiconductor chip, whereby the cross-sectional plane corresponds to the plane of the drawing in FIG. 1A and/or in FIG. 1B.

In the exemplary embodiment shown in FIG. 2A, for the differential measurement of the magnetic field, the magnetic field sensor has two differential magnetic field sensors and in addition two magnetic field sensor elements for the absolute measurement of the magnetic field.

A first differential magnetic field sensor has a first vertical measuring plate 8a and a second vertical measuring plate 8b, which are spaced apart in direction 7 of the relative movement and each extend in a plane running approximately radially to the axis of rotation of transmitter 2, 2'. The measuring signal of the first differential magnetic field sensor corresponds to the derivative of the magnetic field component running in direction 7 of the relative movement at a place that is arranged on a first circular line running through the centers of areas 10a, 10b of first vertical measuring plate 8a and second vertical measuring plate 8b concentrically to the axis of rotation of transmitter 2.

A first magnetic field sensor element has a third vertical measuring plate 8c, which extends in another plane running radially to the axis of rotation of transmitter 2, said plane running centered between the planes of first measuring plate 8a and second measuring plate 8b. The centers of areas 10a, 10b, 10c of all three measuring plates 8a, 8b, 8c lie on the first circular line. The measuring signal of the first sensor element corresponds to the absolute value of the magnetic field component running in direction 7 of the relative movement at the place of the first circular line that is arranged centered between first vertical measuring plate 8a and second vertical measuring plate 8b. The measuring signals of the first differential magnetic field sensor and of the first sensor element therefore relate to the same measuring point.

A second differential magnetic field sensor has a first horizontal measuring plate 9a and a second horizontal measuring plate 9b, which are offset relative to one another in direction 7 of the relative movement and extend in the same plane normal to the axis of rotation of transmitter 2. The measuring signal of the second differential magnetic field sensor corresponds to the derivative of a magnetic field component running parallel to the axis of rotation of transmitter 2 at a place which is arranged centered between said measuring plates 9a, 9b on a second circular line arranged concentrically to the axis of rotation of transmitter 2 and running through the centers of areas 11a, 11b of first horizontal measuring plate 9a and of second horizontal measuring plate 9b.

A second magnetic field sensor element has a third horizontal measuring plate 9c, which extends in the same plane as first horizontal measuring plate 9a and second horizontal measuring plate 9b. The centers of areas 11a, 11b, 11c of all three horizontal measuring plates 9a, 9b, 9c lie on the second circular line. The measuring signal of the second sensor element corresponds to the absolute value of the magnetic field component running parallel to the axis of rotation of transmitter 2, 2' at a place that is arranged centered between first vertical measuring plate 9a and second vertical measuring plate 9b on the second circular line. The measuring signals of the second differential magnetic field sensor and of the second sensor element therefore relate to the same measuring point. Said point is located directly above the measuring point of the first differential magnetic field sensor and of the first sensor element. The tangential and radial components of the magnetic flux penetrating semiconductor chip 6 can be measured with use of the magnetic field sensor shown in FIG. 2A, therefore practically at the same place.

It is noticeable further in FIG. 2A that horizontal measuring plates 9a, 9b, 9c each cross one of the vertical measuring plates 8a, 8b, 8c.

Figure 2B:
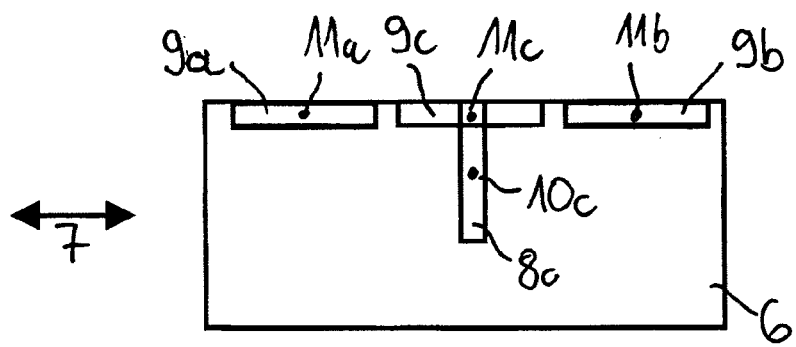

In the exemplary embodiment according to FIG. 2B, four measuring plates are integrated into semiconductor chip 6. Three horizontal measuring plates 9a, 9b, 9c are arranged in the chip plane at constant distances to one another in a series running in direction of motion 7. The two outer horizontal measuring plates 9a, 9b form a differential magnetic field sensor. Another horizontal measuring plate 9c and a vertical measuring plate 8c are arranged centered between said measuring plates 9a, 9b. The vertical measuring plate runs approximately at right angles to direction of motion 7.

Figure 2C:
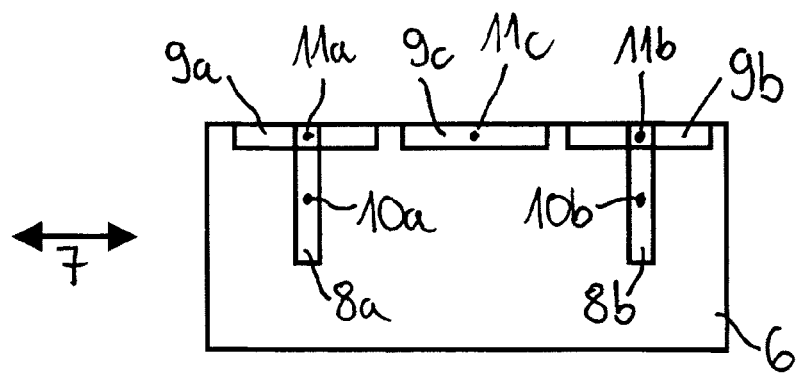

The exemplary embodiment shown in FIG. 2C has two differential magnetic field sensors, which correspond to those in the exemplary embodiment shown in FIG. 2A. In addition, a magnetic field sensor element is provided that has a third horizontal measuring plate 9c, which extends in the same plane as first horizontal measuring plate 9a and second horizontal measuring plate 9b. Centers of areas 11a, 11b, 11c of all three horizontal measuring plates 9a, 9b, 9c lie on a second circular line, which is arranged on a second circular line, arranged concentrically to the axis of rotation of transmitter 2 and running through centers of areas 11a, 11b, 11c of horizontal measuring plates 9a, 9b, 9c in the center between said measuring plates 9a, 9b. The measuring signal of the second sensor element corresponds to the absolute value of the magnetic field component running parallel to the axis of rotation of transmitter 2, 2' at a place that is arranged centered between first vertical measuring plate 9a and second vertical measuring plate 9b on the second circular line. The measuring signals of the second differential magnetic field sensor and of the second sensor element therefore relate to the same measuring point.

Figure 2D:
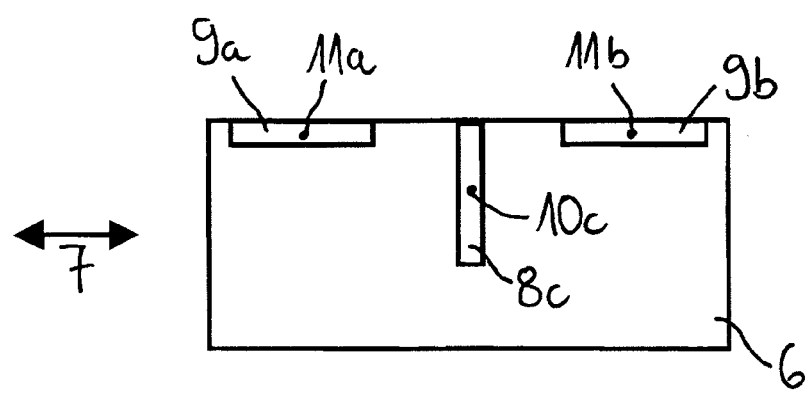

In the exemplary embodiment shown FIG. 2D, a vertical measuring plate 8c is provided centered between two horizontal measuring plates 9a, 9b arranged next to one another in the chip plane. The two aforementioned measuring plates 9a, 9b are part of a differential magnetic field sensor. Vertical measuring plate 8b is oriented approximately at right angles to the chip plane and to direction of motion 7 and arranged centered between horizontal measuring plates 9a, 9b.

Figure 2E:
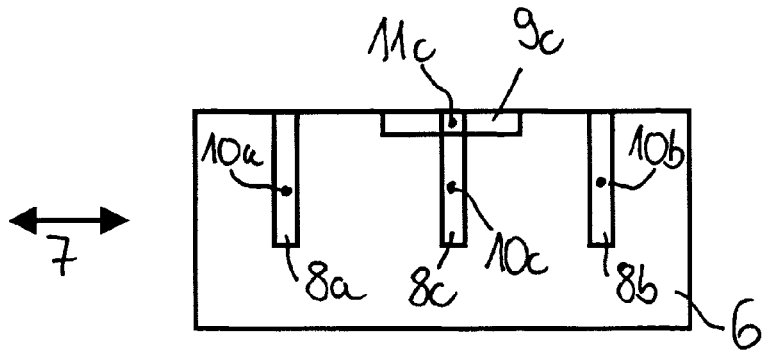

In the exemplary embodiment shown in FIG. 2E, the measuring device has a differential magnetic field sensor, which corresponds to the first differential magnetic field sensor of the exemplary embodiment shown in FIG. 2A. In addition, a first magnetic field sensor element is provided, which has a third vertical measuring plate 8c, which is arranged centered between first vertical measuring plate 8a and second vertical measuring plate 8b in a plane running radially to the axis of rotation of transmitter 2, 2'. Centers of areas 10a, 10b, 10c of all three vertical measuring plates 8a, 8b, 8c lie on a circular line arranged concentrically to the axis of rotation of transmitter 2, 2'. A second magnetic field sensor element, which has a horizontal measuring plate 9c, which crosses third vertical measuring plate 8c, is arranged centered to the first sensor element.

Figure 2F:
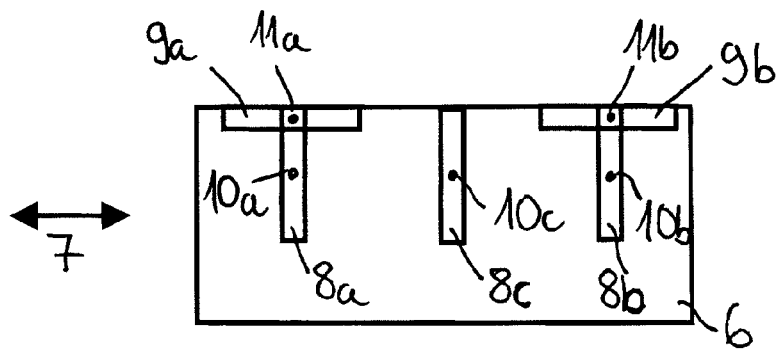

In the exemplary embodiment shown in FIG. 2F, the measuring device has a first and a second differential magnetic field sensor. The first differential magnetic field sensor corresponds to the first differential magnetic field sensor of FIG. 2A and the second differential magnetic field sensor to the second differential magnetic field sensor of said figure. In addition, measuring device 1 shown in FIG. 2F has a magnetic field sensor element, which has a vertical measuring plate 8c, which is arranged centered between first vertical measuring plate 8a and second vertical measuring plate 8b and extends in a plane running radially to the axis of rotation. Centers of areas 10a, 10b, 10c of all three vertical measuring plates 8a, 8b, 8c lie on a circular line arranged concentrically to the axis of rotation of transmitter 2.

Figure 2G:
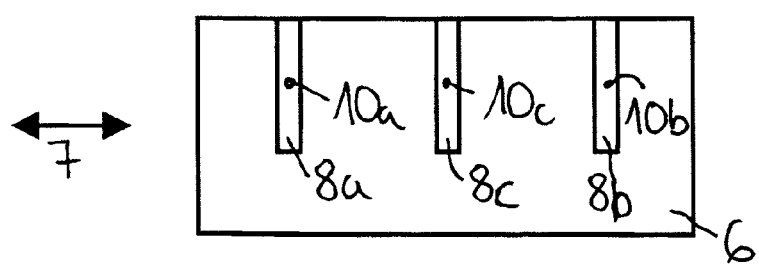

The magnetic field sensor shown in FIG. 2G has a differential magnetic field sensor and in addition a sensor element for the absolute measurement of the magnetic field. The differential magnetic field sensor has a first vertical measuring plate 8a and a second vertical measuring plate 8b, which are spaced apart in direction 7 of the relative movement and each extend in a plane running radially to the axis of rotation of transmitter 2, 2'. The measuring signal of the first differential magnetic field sensor corresponds to the derivative of the magnetic field component running in direction 7 of the relative movement at a place that is arranged on a first circular line running through the centers of areas 10a, 10b of first vertical measuring plate 8a and second vertical measuring plate 8b concentrically to the axis of rotation of transmitter 2.

The sensor element has a third vertical measuring plate 8c, which extends in another plane running radially to the axis of rotation of transmitter 2, said plane running centered between the planes of first vertical measuring plate 8a and second vertical measuring plate 8b. Centers of areas 10a, 10b, 10c of all three vertical measuring plates 8a, 8b, 8c lie on a circular line concentric to the axis of rotation of transmitter 2, 2'. The measuring signal of the sensor element corresponds to the absolute value of the magnetic field component running in direction 7 of the relative movement at the place of the first circular line that is arranged centered between first vertical measuring plate 8a and second vertical measuring plate 8b. The measuring signals of the first differential magnetic field sensor and of the first sensor element therefore here as well relate to the same measuring point.

Figure 2H:
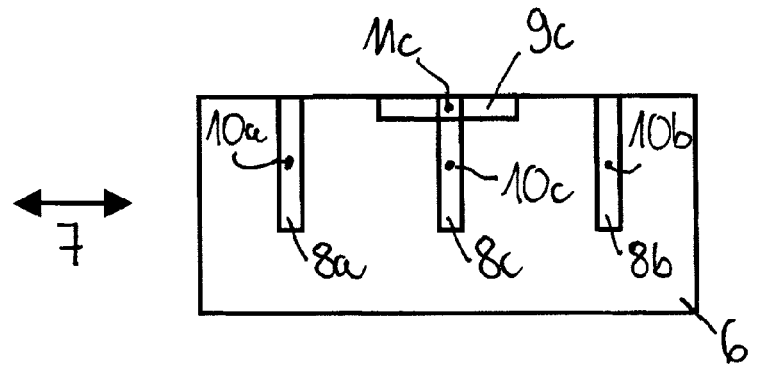

The magnetic field sensor shown in FIG. 2H corresponds in structure to the magnetic field sensor of FIG. 2G, but has in addition a third vertical measuring plate 8c, which is arranged centered between first vertical measuring plate 8a and second vertical measuring plate 8b. Center of area 11c of third horizontal measuring plate 9c is arranged above center of area 10c of third vertical measuring plate 8c.

It should be mentioned further that at least two of the sensor configurations shown in FIGS. 2A-2H can also be integrated next to one another into semiconductor chip 6. This type of measuring device can be used, for example, for a linear path measurement. In a linear path measurement, the planes of vertical measuring plates 8a, 8b, 8c are arranged parallel to one another.

The measuring plates 8a, 8b, 8c, 9a, 9b, 9c shown in the drawing are preferably embodied as Hall plates. Magnetoresistive plates may also be used.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A measuring device for detecting a relative movement between at least one magnetic field sensor array integrated into a semiconductor chip and a transmitter for the sensor array, the transmitter and the sensor array being penetratable by the magnetic flux of a magnet and the transmitter has teeth, which is moved past the sensor array during a relative movement thereof or the transmitter has magnetic poles that are moveable past the sensor array during the relative movement, wherein the sensor array has a differential magnetic field sensor, which has a first measuring plate and a second measuring plate, which are offset relative to one another in a direction of the relative movement and the sensor array has a sensor element, designed for measuring an absolute magnetic field, with a third measuring plate that is arranged between the first measuring plate and the second measuring plate in the direction of the relative movement, wherein the differential magnetic field sensor has at least two of the sensor arrays, each of which include at least the differential magnetic field sensor and the sensor element, and wherein measuring directions of the sensor arrays are oriented transverse and at right angles to one another.

2. The measuring device according to claim 1, wherein measuring signal outputs of at least two measuring plates, offset to one another in the direction of the relative movement, are connected to an evaluation device that has an output terminal to which an output signal dependent on the phase shift, occurring between the measuring signals of the measuring plates and indicating the direction of the relative movement.

3. The measuring device according to claim 1, wherein a measuring signal output of least one measuring plate is connected to a signal converter stage, which has an output, to which the pulses assigned synchronously to the relative movement are output.

4. The measuring device according to claim 1, wherein a signal converter stage is connected to a measuring signal output of at least two measuring plates, which are arranged in planes running transverse and at right angles to one another.

5. The measuring device according to claim 1, wherein measuring signal outputs of at least two measuring plates, which are arranged in planes running transverse and at right angles to one another are connected to an arithmetic logic unit for calculating the arc tangent from the quotient of the measuring signals of the measuring plates.

6. The measuring device according to claim 1, wherein at least one measuring plate has two contact pairs each with spaced-apart terminal contacts for applying Hall sensor currents or for tapping of Hall voltages, wherein the measuring device has a current source for generating Hall sensor currents and output terminals to output the Hall voltage, wherein the terminal contacts are connectable via a switching device to the current source and to the output terminals, and wherein the switching device has a control connection with a control device in such a way that the following steps run through one after another:

a) connecting the current source to a first contact pair and connecting the output terminals to a second contact pair, and b) connecting the current source to the second contact pair and connecting of the output terminals to the first contact pair.

* * * * *